United States Patent [19]

Bennett

[11] 4,160,941

[45] Jul. 10, 1979

[54] MULTI-PURPOSE BATTERY CHARGER

[75] Inventor: James A. Bennett, Northridge, Calif.

[73] Assignee: American Safety Equipment Corporation, Encino, Calif.

[21] Appl. No.: 856,751

[22] Filed: Dec. 1, 1977

[51] Int. Cl.² .............................................. H02J 7/04
[52] U.S. Cl. ...................................... 320/56; 320/59; 307/51; 307/56
[58] Field of Search ........................................ 320/2–4, 320/7, 56, 57–59; 307/43, 51, 56, 72, 73, 150, 151; 361/84

[56] References Cited

U.S. PATENT DOCUMENTS

| | | | |
|---|---|---|---|
| 2,978,596 | 4/1961 | Robirds | 320/59 X |
| 3,317,810 | 5/1967 | Inoue | |
| 3,430,059 | 2/1969 | Wolff | 320/DIG. 1 |
| 3,904,947 | 9/1975 | Crews | 320/56 X |
| 3,919,618 | 11/1975 | Coleman et al. | |
| 4,048,513 | 9/1977 | Frost | 307/56 X |

Primary Examiner—Robert J. Hickey

Attorney, Agent, or Firm—Poms, Smith, Lande & Rose

[57] ABSTRACT

A multi-purpose battery charger is disclosed, capable of simultaneously charging multiple batteries to a common peak voltage and operable from either an A.C. source of power or a D.C. source of power. The power supply portion of the battery charger includes means for causing the D.C. power source to be used as the primary source for charging if the power supply is connected to both an A.C. and a D.C. power source simultaneously. Means are also included for preventing interaction between the sources of power or damage to the charger if such simultaneous connection is made. The battery charger includes voltage regulator means for maintaining a maximum charging rate to all batteries connected to the charger at one time for as long as any one battery is in a discharged state and for reducing the charging current to all the batteries to a low maintenance charging rate when all the batteries are charged. Individual batteries being charged are protected against both overcharging and interaction between batteries.

11 Claims, 1 Drawing Figure

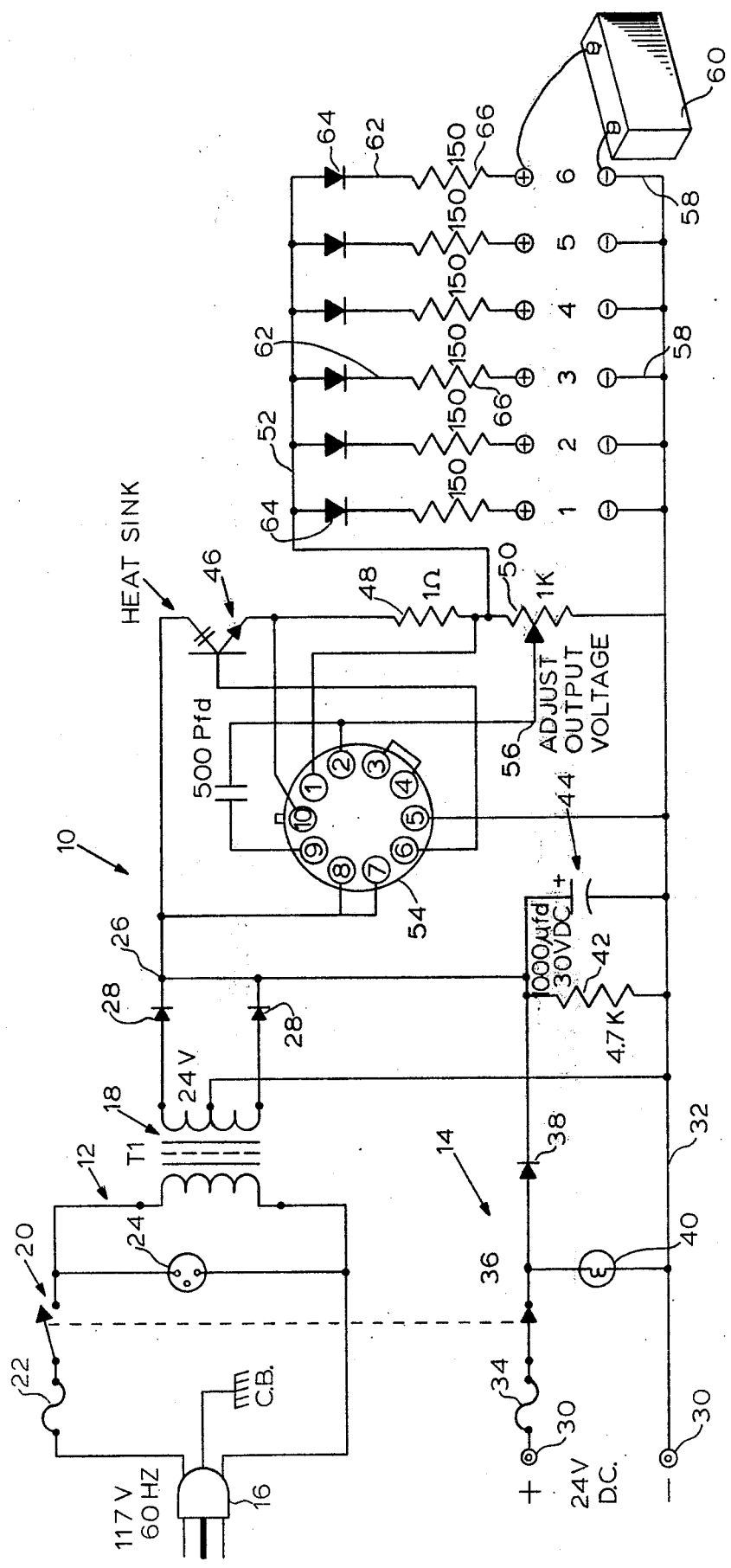

MULTI-PURPOSE BATTERY CHARGER

BACKGROUND OF THE INVENTION

The present invention relates to battery chargers and more particularly to battery chargers adapted for automatic unattended operation.

Modern technology has made portable apparatus containing rechargable battery power supplies common place. Everything from electric drill motors to intercommunication systems are available for portable use without the limitations attendant to the necessity for attachment to a local source of power. Such apparatus has found particular widespread acceptance among emergency organizations such as fire fighters and police. When being used by such organizations, however, portable rechargable battery powered equipment must be constantly at its peak of operational potential. Unlike the casual user, a fire fighter using a portable communications device at the site of an active fire cannot stop to recharge batteries which were inadvertently left in an uncharged condition.

The transportation equipment employed by such organizations typically is outfitted with heavy-duty batteries capable of recharging the small rechargable batteries employed in such portable apparatus. While at the home station, a conventional source of A.C. power is usually available. In the case of a major disaster, however, even such normally available A.C. power may be unavailable for long periods of time. Nevertheless, the radios and the like require recharging after extended periods of use and maintenance at peak operating potential during periods of non-use.

Such organizations typically have a multiplicity of substantially identical units having identical recharging needs. That is, for example, perhaps 6 or 8 hand-held or hat-mounted radio receivers readily adapted for simultaneous recharging. Thus, a battery charger capable of simultaneously recharging a group of such radios simultaneously from whatever power source is immediately available (be it D.C. from the large capacity battery of a fire truck or A.C. from the wall outlet at a fire station) would be highly desirable. Such a battery charger should ideally be adapted to prevent interaction between power sources should the charger be simultaneously connected to both an A.C. source and a D.C. source. Moreover, such a charger should prevent interaction between batteries being simultaneously charged, include voltage regulator means for setting the maximum voltage being charged to, as well as controlling the charging rate to all the batteries in unison, and include means for individually controlling the charging rate to separate batteries as each battery attains its maximum charge level.

Wherefore, it is the object of the present invention to provide a battery charger having the aforementioned attributes as well as other desirable features which will become apparent from reading the description thereof, which follows hereinafter.

SUMMARY OF THE INVENTION

The foregoing objectives have been accomplished by the battery charger of the present invention, which comprises a power supply adapted to be connected to either a source of A.C. power or a source of D.C. power, having a first output and a second output supplying a voltage with reference to one another equal to the charging voltage to be applied to the batteries, having a total amperage output capacity to provide fully charging capability to all the batteries simultaneously, and including means for preventing interaction between the sources of power or damage to the charger if connected to both simultaneously; a plurality of first connectors connected to the first output on one end and adapted to be connected to one terminal of a battery on the other end; and, a plurality of second connectors connected to the second output on one end and adapted to be connected to the other terminal of a battery on the other end, the second connectors each including diode means for allowing charging current to pass through a battery connected in proper polarity between one of the first connectors and one of the second connectors, while preventing current from the battery from flowing to the power supply or the other batteries being charged simultaneously. In the preferred embodiment shown, the power supply includes means for causing the D.C. power source to be used as the primary source for charging if the power supply is connected to both an A.C. and a D.C. power source simultaneously; the second connectors each include voltage dropping means for reducing the charging current flowing through an individual battery to a low maintenance charging rate when it is fully charged; the power supply includes voltage regulator means for automatically setting the charging current available between the first output and the second output whereby the maximum charging rate to all batteries connected to the charger at one time is set; the voltage regulator means including feedback means responsive to the charging needs of the batteries being charged for maintaining a high charging current as long as any one battery is in a discharged state and reducing the charging current to all the batteries to a low maintenance charging rate when all the batteries are charged; and, the voltage regulator means includes means for selectively changing the voltage being output between the first output and the second output.

DESCRIPTION OF THE DRAWINGS

The single FIGURE is a flow chart of a battery charger according to the preferred embodiment of the present invention.

DESCRIPTION OF THE PREFERRED EMBODIMENT

Referring now to the single drawing, a flow chart is shown as employed in a tested embodiment of the present invention used for charging portable communications equipment incorporated within helmets worn by fire fighters. In the embodiment shown, either 117 volts at 60 Hz or 24 volts D.C. as typically available on a fire truck, can be used to recharge from one to six batteries simultaneously. The battery charger indicated generally as 10, includes a first power supply circuit generally indicated as 12, and a second power supply circuit generally indicated as 14. First power supply circuit 12 comprises a plug 16 adapted to be inserted into a conventional outlet providing 117 volts at 60 Hz. It is preferred that plug 16 be of the type having 3 prongs thereon, wherein the center plug is grounded as shown to prevent shocking personnel who may touch the apparatus. The two prongs of plug 16 which connect to the A.C. power, are connected to either side of the primary of a transformer 18. It is preferred that the connection to the primary of transformer 18 have a switch 20 and a fuse 22 of appropriate amperage rating connected in series therewith to provide protection therefore and a means of turning the A.C. power off and on without disconnecting plug 16. Additionally, it is preferred that a neon indicator bulb 24 be connected in parallel with the primary winding of transformer 18 and made visible to an operator whereby visual indication will be readily apparent when battery charger 10 is connected to an active 117 volt, 60 Hz power source. The secondary of transformer 18 is center tapped to provide 24 volts between either end of the secondary winding and the center tap. The output of the secondary of transformer 18 is connected to a common point 26 through a pair of diodes 28, so as to provide 24 volts of rectified D.C. at common point 26. Diodes 28 also provide insolation for first power supply circuit 12 in a manner which will become apparent hereinafter. All diodes used herein are 1N4001 diodes available from Motorola Semiconductor Products, Inc.

The second power supply circuit 14 comprises a pair of input terminals 30 adapted to be connected to a source of D.C. voltage, in this case the positive (+) and negative (−) terminals of the 24 volt battery in a fire truck. The negative (−) input terminal 30 is connected to a negative (−) potential line 32 of the battery charger 10. The positive (+) input terminal 30 is connected through a fuse 34, a switch 36, and a diode 38 to common point 26. It will be noted that, as a safety measure, switch 20 and switch 36 are ganged together for simultaneous operation in opposite directions. That is, when switch 20 is opened switch 36 is closed and vice versa. An incandescent bulb 40 is connected in parallel across the 24 volt D.C. potential of second power supply circuit 14 between switch 36 and diode 38, so as to indicate when second power supply circuit 14 is actively connected to a source of D.C. power.

An RC filter network comprising a 4.7 K ohm resistor 42 in parallel with a 1,000 microfarad capacitor 44 is connected between common point 26 and negative potential line 32. It will be appreciated that as thus configured, first power supply circuit 12 is prevented from feeding back into the 24 volt D.C. power source through second power supply circuit 14 by virtue of diode 38. In a similar fashion, second power supply circuit 14 is prevented from feeding back through into the 117 volt, 60 Hz power source by diodes 28. Further, as long as the current potential of the 24 volt D.C. power source feeding second power supply circuit 14 is sufficient to meet the current requirements of the batteries being charged, should switches 20 and 36 be eliminated or malfunction such that first power supply circuit 12 and second power supply circuit 14 are simultaneously connected to respective sources of power, not only will neither feed backward into the other because of the diodes 28, 38 previously discussed, but, moreover, second power supply circuit 14 will act as the source of current to the batteries being charged.

Common point 26 providing 24 volts D.C. thereat, is connected to negative potential line 32 through power transistor 46 (MJE2801—Motorola Semiconductor Products, Inc.) which is in series with one ohm resistor 48 and one K ohm resistor 50. A positive (+) potential line 52 is connected to the junction between one ohm resistor 48 and one K ohm resistor 50. The voltage appearing on positive potential line 52 is controlled by a voltage regulator 54. A model LM723 integrated circuit voltage regulator available from National Semiconductor Corporation was found to give preferred results when employed in the battery charger 10 shown. Specifics of the LM723 voltage regulator are available from the manufacturer. One K ohm resistor 50 is a potentiometer, the wiper arm 56 of which is connected back to voltage regulator 54 so as to allow selectability of the voltage appearing on positive potential line 52. In this manner, battery charger 10 can be used to recharge batteries of any voltage less than or equal to 24 volts. While 24 volts was chosen in the present embodiment as a maximum voltage, this was by choice of the particular equipment involved only. it is to be understood that by selection of a proper voltage regulator 54 and a transformer 18, along with the proper scaling of components used therein, the circuit of the present invention could be adapted for employment with maximum voltages beyond the 24 volts employed herein.

While a single battery could be connected between positive potential line 52 and negative potential line 32 for charging by the battery charger 10, heretofore described from either an A.C. source or a D.C. source, the battery charger 10 of the present invention is further provided with the capability of simultaneously charging a plurality of similar voltage batteries. To this end, a plurality of first connectors 58 are connected to negative potential line 32 on one end and adapted to be connected on the other end to the negative (−) terminal of a battery such as that indicated as 60. A plurality of second connectors 62 are connected to positive potential line 52 on one end and adapted to be connected on the other end to the positive terminal of a battery such as that indicated as 60. In the preferred embodiment as shown, each second connector 62 has a diode 64 connected in series therewith in proper polarity to allow charging current to pass between potential lines 32, 52 through a battery 60 to charge the battery but prevent current flow from the battery. Further, each second connector 62 has a 150 ohm resistor 66 in series therewith to prevent overcharging of the battery connected between the respective first connector 58 and second connector 62.

As thus configured, wiper arm 56 of potentiometer resistor 50 provides voltage regulator 54 with an indication of the current flowing between negative potential line 32 and positive potential line 52. As long as any one battery 60 connected between first connector 58 and a second connector 62 is drawing full charging current, voltage regulator 54 will sense this by the voltage potential developed across the portion of potentiometer resistor 50 between wiper arm 56 and negative potential line 32. As long as any one battery 60 is drawing maximum charging current, voltage regulator 54 will, accordingly, maintain a full charging current flow through the power transistor 46. When all the batteries 60 connected between first connectors 58 and second connectors 62 have been charged, the change in the signal level at wiper arm 56 will be sensed by voltage regulator 54 and the current flow through power transistor 46 reduced accordingly to a low maintenance charging rate. As long as the charging rate is at its maximum level, as each battery 60 connected between a first connector 58 and a second connector 62 reaches full charge, their respective 150 ohm resistor 66 will prevent maximum current from flowing therethrough. That is, the dropping resistor 66 will cause the current flowing through the individual battery to be reduced to a low maintenance charging rate.

Thus, it will be seen that the battery charger circuit herein before described has met the stated objectives of the present invention by providing a battery charger capable of charging a plurality of batteries simultaneously from either an A.C. power source or a D.C. power source, without interaction between the batteries being charged or the alternative power sources should the charger be inadvertently connected to both power sources simultaneously.

Having thus described by invention, I claim:

1. A battery charger for simultaneously charging multiple batteries comprising:
   (a) a power supply adapted to be connected to either a source of a.c. power or a source of d.c. power, having a first output and a second output supplying a voltage with reference to one another equal to the charging voltage to be applied to the batteries, having a total amperage output capacity to provide fully charging capability to all the batteries simultaneously, and including means for preventing interaction between the sources of power or damage to the charger if connected to both simultaneously;
   (b) a plurality of first connectors connected to said first output on one end and adapted to be connected to one terminal of a battery on the other end; and,
   (c) a plurality of second connectors connected to said second output on one end and adapted to be connected to the other terminal of a battery on the other end, said second connectors each including diode means for allowing charging current to pass through a battery connected in proper polarity between one of said first connectors and one of said second connectors while preventing current from the battery from flowing to said power supply or the other batteries being charged simultaneously.

2. The battery charger claimed in claim 1 wherein additionally:
   said power supply includes means for causing the d.c. power source to be used as the primary source for charging if said power supply is connected to both an a.c. and a d.c. power source simultaneously.

3. The battery charger claimed in claim 1 wherein additionally:
   said second connectors each include voltage dropping means for reducing the charging current flowing through an individual battery to a low maintenance charging rate when it is fully charged.

4. The battery charger claimed in claim 1 wherein:
   said power supply includes voltage regulator means for automatically setting the charging current available between said first output and said second output whereby the maximum charging rate to all batteries connected to the charger at one time is set, said voltage regulator means including feedback means responsive to the charging needs of the batteries being charged for maintaining a high charging current as long as any one battery is in a discharged state and reducing the charging current to all the batteries to a low maintenance charging rate when all the batteries are charged.

5. The battery charger claimed in claim 4 wherein:
   said voltage regulator means includes means for selectively changing the voltage being output between said first output and said second output.

6. A multi-purpose battery charger comprising:
   (a) a first power supply means having a pair of inputs and a pair of outputs, said inputs being connectable to a source a.c. power, said outputs having a d.c. voltage V produced thereat at a current potential $I_1$;
   (b) second power supply means having a pair of inputs and a pair of outputs, said inputs being connectable to a source of d.c. power, said outputs having a d.c. voltage V produced thereat at a current potential $I_2$, one of said outputs of said first power supply means being connected to one of said outputs of said second power supply means to form a first common output; and,
   (c) first and second diode means connected to respective ones of the other of said outputs of said first and second power supplies on one end and connected to each other on the other end for forming a second common output including means for preventing current from flowing from one of said power supplies into the other whereby said second power supply is the primary source of current between a circuit connected across said first and second outputs as long as $I_2$ is greater than $I_1$ and damage to said power supplies is prevented if both of said power supplies have their inputs connected to an appropriate source of power simultaneously.

7. The battery charger claimed in claim 6 and additionally including:
   (a) a plurality of first connectors connected to said first common output on one end and adapted to be connected to one terminal of a battery on the other end; and,
   (b) a plurality of second connectors connected to said second common output on one end and adapted to be connected to the other terminal of a battery on the other end, said second connectors each including diode means for allowing charging current to pass through a battery connected in proper polarity between one of said first connectors and one of said second connectors while preventing current from the battery from flowing to said power supply means or the other batteries being charged simultaneously.

8. The battery charger claimed in claim 7 wherein:
   said second connectors each include voltage dropping means for reducing the charging current flowing through an individual battery to a low maintenance charging rate when the battery is fully charged.

9. The battery charger claimed in claim 6 and additionally including:
   voltage regulator means for automatically setting the charging current available between said first common output and said second common output whereby the maximum charging rate to all batteries connected to the charger at any one time is set, said voltage regulator means including feedback means responsive to the charging needs of the batteries being charged for maintaining a high charging current as long as any one battery is in a discharge state and reducing the charging current to all the batteries to a low maintenance charging rate when all the batteries are charged.

10. The battery charger claimed in claim 9 wherein:
    said voltage regulator means includes means for selectively changing the voltage being output between said first common output and said second common output.

11. In battery charging apparatus comprising a power supply having a pair of inputs for connecting to a source of power and a pair of outputs for connecting to a battery to be charged, the improvement comprising:

(a) first circuit means having a pair of inputs adapted to be connected to a source of a.c. power and a pair of outputs of voltage V therebetween;
(b) second circuit means having a pair of inputs adapted to be connected to a source of d.c. power and a pair of outputs of voltage V therebetween;
(c) first isolation means connecting said outputs of said first circuit means to the input of the power supply; and,
(d) second isolation means connecting said outputs of said second circuit means to the input of the power supply whereby the battery charger can be operated by connecting it to either an a.c. source of power or a d.c. source of power and no damage will be done if the battery charger is connected to both an a.c. and a d.c. power source simultaneously or to a d.c. power source of the wrong polarity.

* * * * *